(No Model.)
A. ZWIROW.
BACK PEDALING BRAKE.
No. 603,310. Patented May 3, 1898.
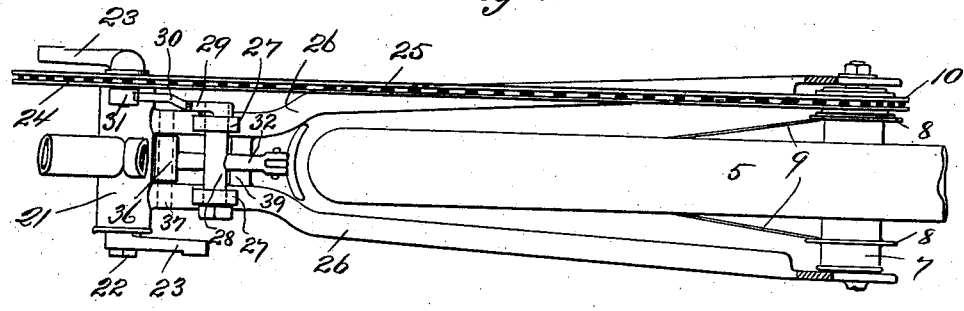
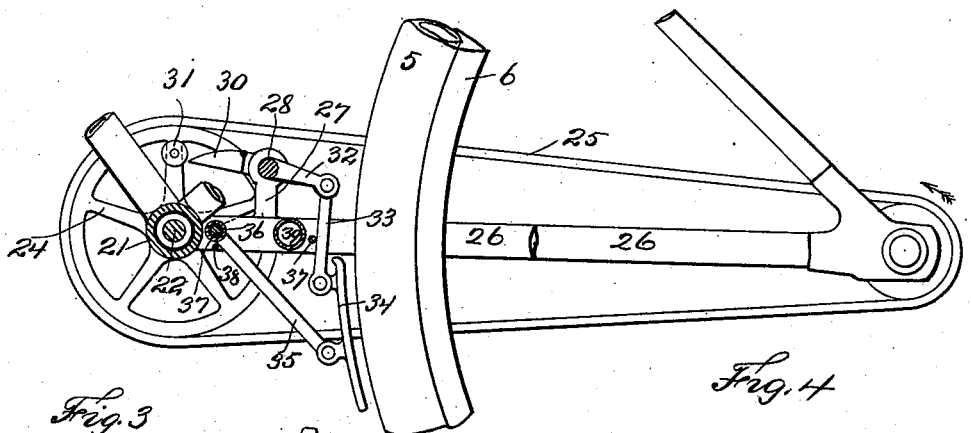
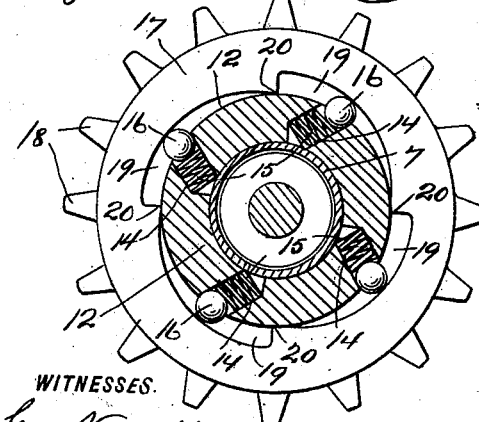
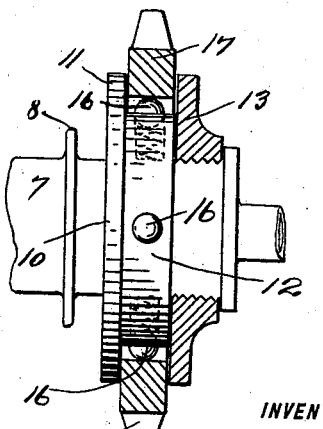
WITNESSES.
C. Nordfors
C. Gersh
INVENTOR
Apollo Zwirow
BY
Edgar Tate & Co.
ATTORNEYS.

UNITED STATES PATENT OFFICE.

APOLLO ZWIROW, OF HOBOKEN, NEW JERSEY.

BACK-PEDALING BRAKE.

SPECIFICATION forming part of Letters Patent No. 603,310, dated May 3, 1898.

Application filed June 30, 1897. Serial No. 643,000. (No model.)

*To all whom it may concern:*

Be it known that I, APOLLO ZWIROW, a subject of the Czar of Russia, residing at Hoboken, in the county of Hudson and State of New Jersey, have invented certain new and useful Improvements in Bicycles or Similar Vehicles, of which the following is a full and complete specification, such as will enable those skilled in the art to which it appertains to make and use the same.

This invention relates to bicycles and similar vehicles; and the object thereof is to provide a vehicle of this class with improved means for throwing the sprocket-wheel on the hub or axle of the drive-wheel out of operation when going down a hill or incline, a further object being to provide an improved brake mechanism which is adapted to operate in connection with the drive-wheel of a bicycle or similar vehicle, the hub or axle of which is provided with a sprocket-wheel which may be thrown out of operation when desired.

The invention is fully disclosed in the following specification, of which the accompanying drawings form a part, in which—

Figure 1 is a plan view of the pedal-shaft of a bicycle or similar vehicle provided with my improvement and showing the parts connected with the pedal-shaft and also a part of the drive-wheel, the hub or axle thereof, and the sprocket-wheel mounted thereon, together with a drive-chain; Fig. 2, a sectional side view of the construction shown in Fig. 1; Fig. 3, a sectional side view of the sprocket-wheel which I employ in connection with the hub or axle of the drive-wheel of the vehicle, and Fig. 4 a sectional view at right angles to that of Fig. 3.

In the drawings forming part of this specification the separate parts of my improvement are designated by the same numerals of reference in each of the views, and in said drawings I have shown at 5 a part of the tire of the drive-wheel of a bicycle or similar vehicle, which is provided with the usual rim 6 and the hub or axle 7, and the hub or axle 7 is provided with the usual annular flanges 8, with which the spokes 9 of the drive-wheel are connected. I also provide a sprocket-wheel 10 for the hub or axle of the drive-wheel, which consists, as shown in Figs. 3 and 4, of a circular disk 11, which is mounted on one end of the hub or axle 7 and rigidly secured thereto and which is provided with an outwardly-directed hub 12, and mounted on the end of the hub or axle 7 of the drive-wheel is a collar 13, said collar 13 being connected with said hub or axle by means of a screw-thread or in any preferred manner.

The hub 12 of the sprocket-wheel 10 is provided in the perimeter thereof with tangential notches or recesses 14, four of which are shown, and these tangential notches or recesses open in the direction in which the sprocket-wheel 10 turns in the forward movement of the vehicle, said direction being indicated by the arrow *a* in Fig. 3, and mounted in each of said tangential notches or recesses is a spiral spring 15, and said tangential notches or recesses are each also provided with balls 16, which are preferably composed of steel.

The sprocket-wheel proper consists of an annular band or rim 17, which is provided on its outer perimeter with sprockets or projections 18, and said band or rim 17 is mounted on the hub 12 of the disk or plate 11, and the inner perimeter thereof is provided with a plurality of segmental cavities or recesses 19, which equal in number the tangential cavities or recesses in the hub 12, and these cavities or recesses 19 are much deeper at one end than at the other, whereby inwardly-directed shoulders or projections 20 are formed, which abut against the hub 12. The operation of this sprocket-wheel will be readily understood from the foregoing description when taken in connection with the accompanying drawings and the following statement thereof.

The circular or segmental cavities or recesses taper to a point at the end opposite the shoulders or projections 20, and the balls 16 are adapted to be projected into said cavities or recesses, and when the sprocket-wheel proper, consisting of the rim or band 17, is turned in the direction of the arrow *a*, so as to propel the vehicle, the shoulders or projections 20 strike against the balls 16 and carry the drive-wheel of the vehicle around in the usual manner and as will be readily understood, and whenever it is necessary to throw the rim or band 17 out of operation it is only necessary to back-pedal, and said rim or band 17 will be turned in the opposite direction, while the drive-wheel of the vehicle will revolve forwardly, as before.

The brake mechanism which I employ is particularly adapted for use in connection with the hereinbefore-described construction and is intended to be applied to the drive-wheel after the rim or band 17 of the sprocket-wheel on the hub or axle of said drive-wheel has been thrown out of operation, as hereinbefore described, and this brake mechanism I will now proceed to describe.

I have also shown in the drawings the hub or support 21 of the pedal-shaft 22, and said pedal-shaft is provided with the usual pedal-cranks 23 and with the usual sprocket-wheel 24 at one end thereof, and the usual drive-chain 25 is also employed, and the lower horizontal side bars 26 of the frame of the vehicle, between which the drive-wheel is mounted, are provided adjacent to the hub or support 21 of the pedal-shaft with upwardly-directed standards 27, in which is mounted a shaft 28, which is provided at one end with a crank 29, to which is hinged a wedge-shaped pawl 30, which is adapted to operate in connection with a roller 31, mounted on the inner side of the sprocket-wheel 24, and the shaft 20 is also provided centrally with a backwardly-directed arm 32, to which is pivoted a rod 33, which is pivotally connected at its lower end with the upper end of a brake-shoe 34, which is adapted to bear on the tire 5 of the drive-wheel, and pivotally connected with the brake-shoe 34, below the connection of the rod 33, is another rod 35, which is secured to or formed on a hub 36, mounted on a shaft 37 in front of the hub or support 21 of the pedal-shaft, and secured to the side rods 26 of the frame of the vehicle are cross-rods 38, which limit the backward and downward movement of the rods 33 and 35, respectively, so as to hold the brake-shoe 34 normally in the position shown in Fig. 2. I have also shown in Figs. 1 and 2 the tubular cross-rod 39, by which the rods 26 of the frame of the vehicle are connected and braced, and the operation of this apparatus will be readily understood from the foregoing description when taken in connection with the accompanying drawings and the following statement thereof.

When the sprocket-wheel 24 on the pedal-shaft is revolving normally or in the forward direction, the roller 31 will strike the under side of the wedge-shaped pawl 30 and the brake will not operate; but when said sprocket-wheel is turned backwardly by back-pedaling the said roller will strike the upper side of said pivoted pawl 31 and the brake-shoe 34 will be thrown backwardly into contact with the tire 5 of the drive-wheel.

It will be understood, as hereinbefore stated, that the backward movement of the sprocket-wheel 24 also throws the sprocket-wheel 10, or the rim or band 17 thereof, which constitutes the sprocket-wheel proper, on the hub or axle of the drive-wheel out of operation, thus leaving the drive-wheel free to turn forwardly; but with my improved mechanism at the same time that this operation of the sprocket-wheel on the hub or axle of the drive-wheel takes place the brake is thrown into contact with the tire of said drive-wheel, and the vehicle is thus brought to a stand.

It will be apparent that my improved brake mechanism need not necessarily be used in connection with my improved sprocket-wheel on the hub or axle of the drive-wheel; but I prefer to use the same as herein described, and it will be apparent that many changes in and modifications of the construction herein described may be made without departing from the spirit of my invention or sacrificing its advantages.

Having fully described my invention, I claim as new and desire to secure by Letters Patent—

1. In a bicycle-brake, the combination with a sprocket-wheel adapted to be thrown out of action by back-pedaling, of standards supported by the frame of the wheel, a shaft mounted in said standards, a hinged pawl connected with said shaft, a roller-bearing on said sprocket-wheel, a brake-shoe and connections between said brake-shoe and said shaft, whereby when said wheel is revolved backwardly, said roller-bearing in conjunction with said pawl will apply said brake-shoe to the tire of the wheel, substantially as described.

2. The combination with the hub or axle of the drive-wheel of a bicycle or similar vehicle, of a sprocket-wheel which is adapted to be thrown out of action by back-pedaling, and a brake device which is connected with the frame of the vehicle adjacent to the support of the pedal-shaft, said brake device being adapted to operate in connection with the tire of the drive-wheel when the pedal-shaft is turned backwardly, and consisting of a roller mounted on, or connected with the sprocket-wheel on the pedal-shaft, a suitably-supported shaft which is provided at one end with a hinged pawl which is adapted to be operated by said roller, and centrally thereof, with a backwardly-directed arm which is pivotally connected with a rod which is pivotally connected with the brake-shoe, said brake-shoe being also pivotally connected with a rod which is pivotally connected with the frame of the vehicle adjacent to the support of the pedal-shaft, substantially as shown and described.

In testimony that I claim the foregoing as my invention I have signed my name, in presence of the subscribing witnesses, this 28th day of June, 1897.

APOLLO ZWIROW.

Witnesses:
  C. GERST,
  A. C. VAN BLARCOM.